(12) United States Patent
Julien et al.

(10) Patent No.: US 11,753,240 B2
(45) Date of Patent: Sep. 12, 2023

(54) DOCUMENT DESTRUCTION LID (71) Applicants: IMPACT PLASTICS CORPORATION, Elgin, IL (US); SIERRA CONTAINER GROUP, Ocala, FL (US)

(72) Inventors: Adam Donald Julien, Oswego, IL (US); Sean Mason, Woodstock, GA (US)

(73) Assignees: Impact Plastics Corporation, Elgin, IL (US); Sierra Container Group, Ocala, FL (US)

( * ) Notice: Subject to any disclaimer, the term of this patent is extended or adjusted under 35 U.S.C. 154(b) by 0 days.

(21) Appl. No.: 17/348,398

(22) Filed: Jun. 15, 2021

(65) Prior Publication Data
US 2021/0387800 A1 Dec. 16, 2021

Related U.S. Application Data (60) Provisional application No. 63/039,583, filed on Jun. 16, 2020.

(51) Int. Cl.
*B65F 1/16* (2006.01)
(52) U.S. Cl.
CPC .......... *B65F 1/1607* (2013.01); *B65F 1/1615* (2013.01); *B65F 2210/148* (2013.01); *B65F 2240/1562* (2013.01)
(58) Field of Classification Search
CPC .... B65F 1/1607; B65F 1/1615; B65F 1/1426; B65F 1/10; B65F 1/1646; B65F 2210/148; B65F 2210/1121; B65F 2240/1562; A61B 50/36; A61B 50/362

USPC .............. 220/315, 908, 254.1; 206/364, 365
See application file for complete search history.

(56) References Cited

U.S. PATENT DOCUMENTS

| 5,184,720 A * | 2/1993 | Packer ................. A61B 50/362 |
| | | 206/366 |
| 8,783,494 B2 * | 7/2014 | Lee ......................... A61B 50/36 |
| | | 220/252 |

FOREIGN PATENT DOCUMENTS

JP 3204628 * 6/2016 ................ B65F 1/16

* cited by examiner

*Primary Examiner* — John K Fristoe, Jr.
*Assistant Examiner* — Elizabeth J Volz
(74) *Attorney, Agent, or Firm* — Katten Muchin Rosenman LLP (57) ABSTRACT

Disclosed herein is a document destruction lid for preventing the retrieval of documents inserted through the lid. The lid comprises a skirt extending around a periphery of the lid for securing the lid to a container. A vertical sidewall extending downward from a top surface of the lid, having a height greater than or equal to 70% of a height of a lip of the container. A security structure for depositing the documents extends from a top surface of the lid. The security structure comprises a front wall, a horizontal slot, a rear wall extending upwards from the top surface of the lid opposite the front wall, and a top surface joining the front wall to the rear wall. The front wall and rear wall are angled away from each other to make document retrieval difficult while still allowing easy disposal of the documents.

15 Claims, 8 Drawing Sheets

DOCUMENT DESTRUCTION LID

CROSS-REFERENCE TO RELATED APPLICATIONS

This application claims priority to U.S. Provisional Application Ser. No. 63/039,583, filed Jun. 16, 2020, the entire contents of which are hereby incorporate by reference in their entirety.

FIELD OF THE INVENTION

The invention relates to document destruction lids for use on containers. More particularly, the invention discloses a document destruction lid having a security structure for preventing and/or reducing retrieval of documents placed in the container.

BACKGROUND

Lids for containers are designed for a number of purposes, but mainly exist to keep the contents in the container separated from the outside environment. Some lids, such as document destruction lids, have a slot for feeding documents into the container for later shredding or disposal. Many of the disposed documents may contain private or confidential information. If the slot in the document destruction lid is too large or if the lid is not securely fastened to the container, these documents can be retrieved and possibly made public. Therefore, a need exists for a document destruction lid with a security structure that is securely attached to the container.

SUMMARY

The document destruction lid according to the invention comprises a skirt extending around a periphery of the lid for securing the lid to a container. A vertical sidewall extending downward from a top surface of the lid, having a height greater than or equal to 70% of a height of a lip of the container. A security structure for depositing the documents extends from a top surface of the lid. The security structure comprises a front wall, a horizontal slot, a rear wall extending upwards from the top surface of the lid opposite the front wall, and a top surface joining the front wall to the rear wall. The front wall and rear wall are angled away from each other to make document retrieval difficult while still allowing easy disposal of the documents.

DETAILED DESCRIPTION

Figure 1:
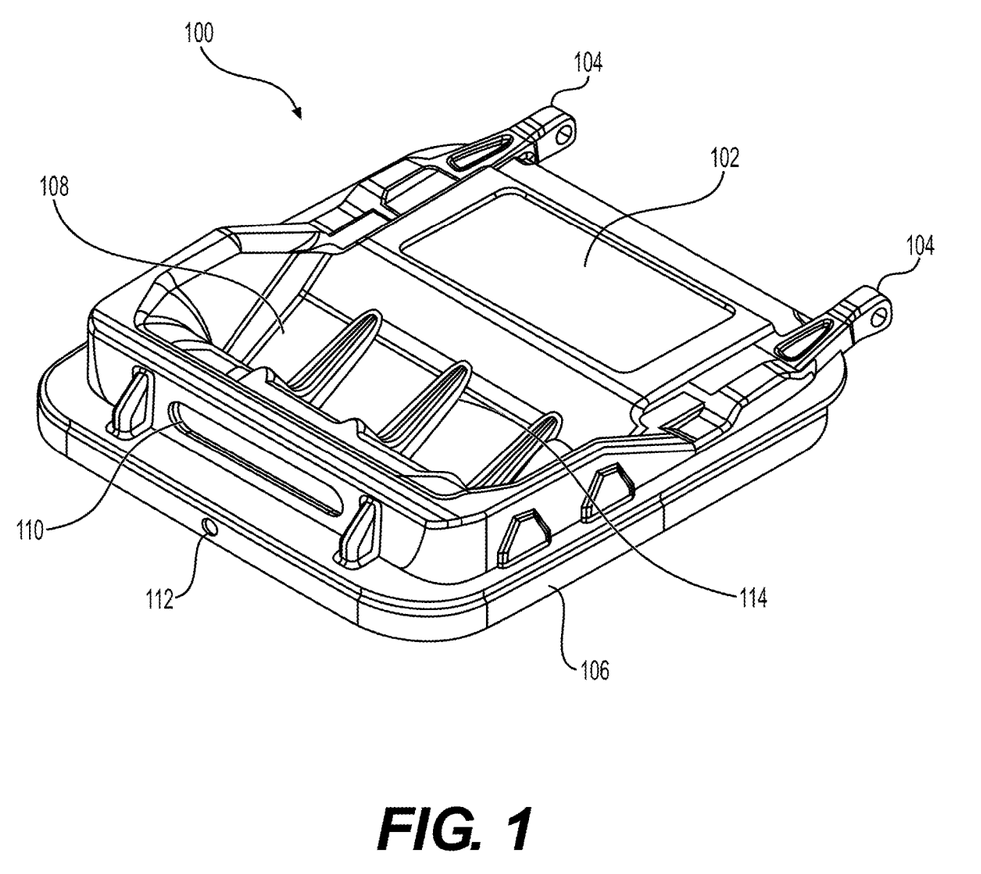
FIG. 1 depicts a front right perspective view of the document destruction lid in isolation.
Figure 2:
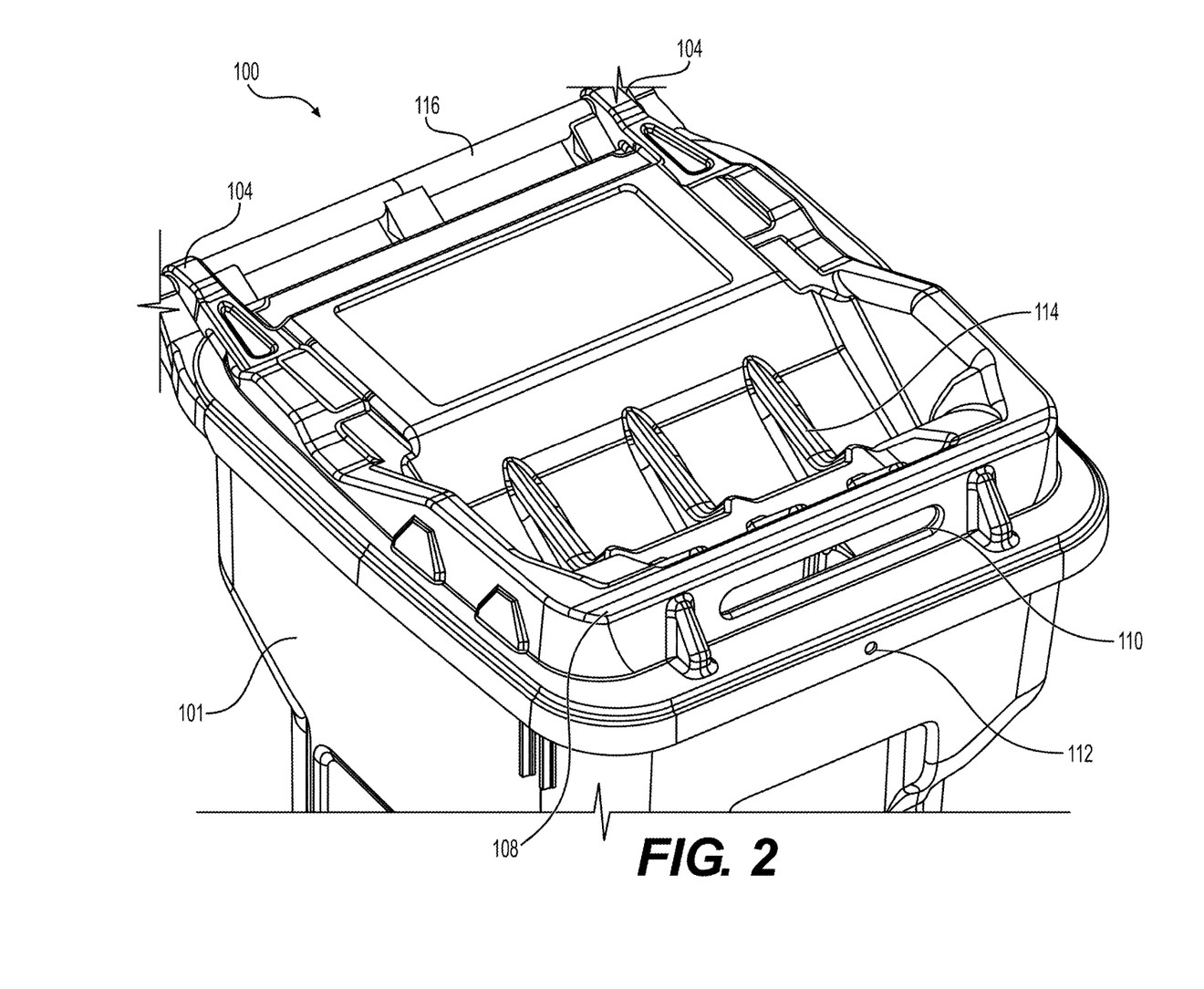
FIG. 2 depicts a front left perspective view of the document destruction lid coupled to a container.

FIG. 1 depicts a front right perspective view of document destruction lid 100 in isolation and FIG. 2 depicts a front left perspective view of document destruction lid 100 coupled to container 101. Document destruction lid 100 generally comprises top surface 102, hinges 104, skirt 106, security structure 108, document slot 110, and key lock 112.

A spacing between hinges 104 is preferably 19.27" and each hinge 104 is preferably ~1.6" in width. Document destruction lid 100 preferably has a total width of ~29.05", a total height of ~6.64", and a total length of ~33.80" with all corners rounded. With these dimensions, document destruction lid 100 preferably has a weight of 5.75-6.5 lbs.

The dimensions of document destruction lid 100 can be varied to accommodate a wide variety of containers 101. Document destruction lid 100 is preferably formed using thermoforming from a resilient and durable plastic material so there are no parting lines susceptible to breakage.

A rear portion of top surface 102 is preferably flat whereas a front portion of top surface 102, in the vicinity of security structure 108, comprises reinforcing ribs 114. As shown in FIG. 2, hinges 104 mate with rail 116 of container 101 to permit document destruction lid 100 to be opened and closed when not locked.

Figure 3:
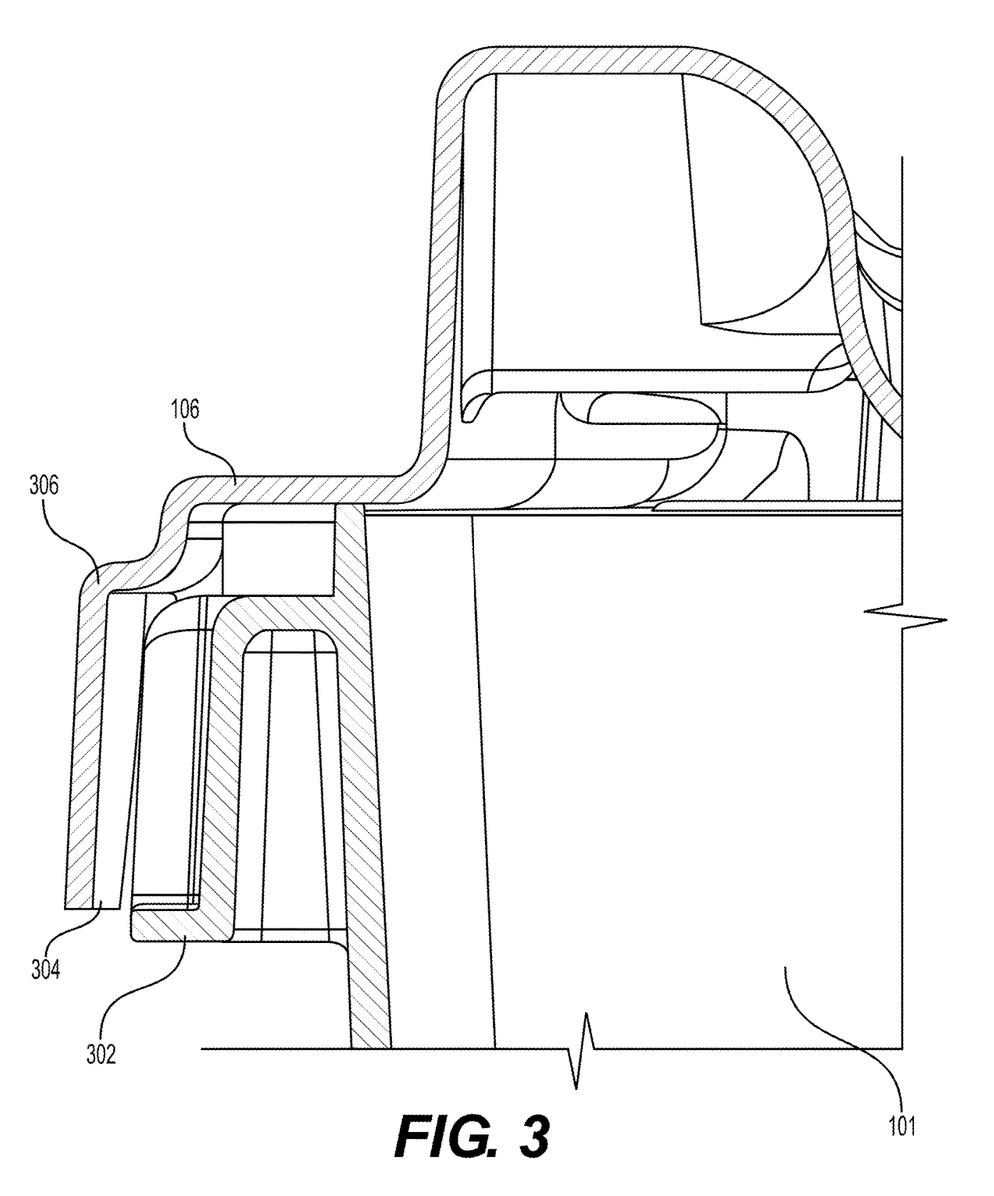
FIG. 3 depicts a cross-section view of the coupling of the skirt with the container flange.

Skirt 106, when attached to container 101, covers 70% or more of the container flange. FIG. 3 depicts a cross-section view showing the mating of skirt 106 with container flange 302. The gap 304 between vertical sidewall 306 of skirt 106 with container flange restricts people from being able to feed their hands or tools under document destruction lid 100 to dislodge it from container 101. Preferably, vertical sidewall 306 is substantially the same height as container flange 302 as depicted in FIG. 3.

Figure 4:
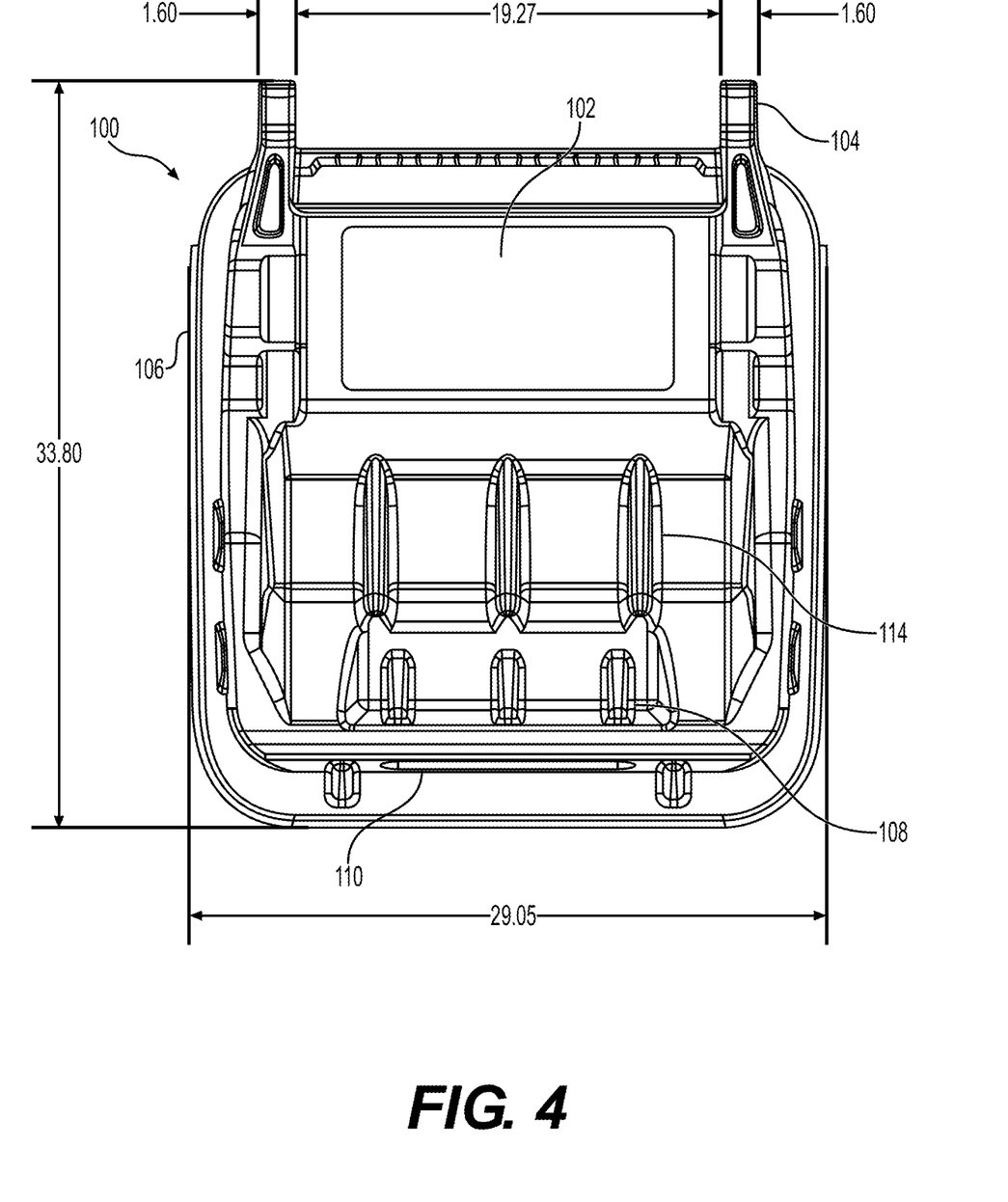
FIG. 4 depicts a top plan view of the document destruction lid.

FIG. 4 depicts a top plan view of document destruction lid 100 in isolation. The skirt 106 extends completely around the front of document destruction lid 100 and covers the majority of the left and right sides of document destruction lid 100.

Figure 5:
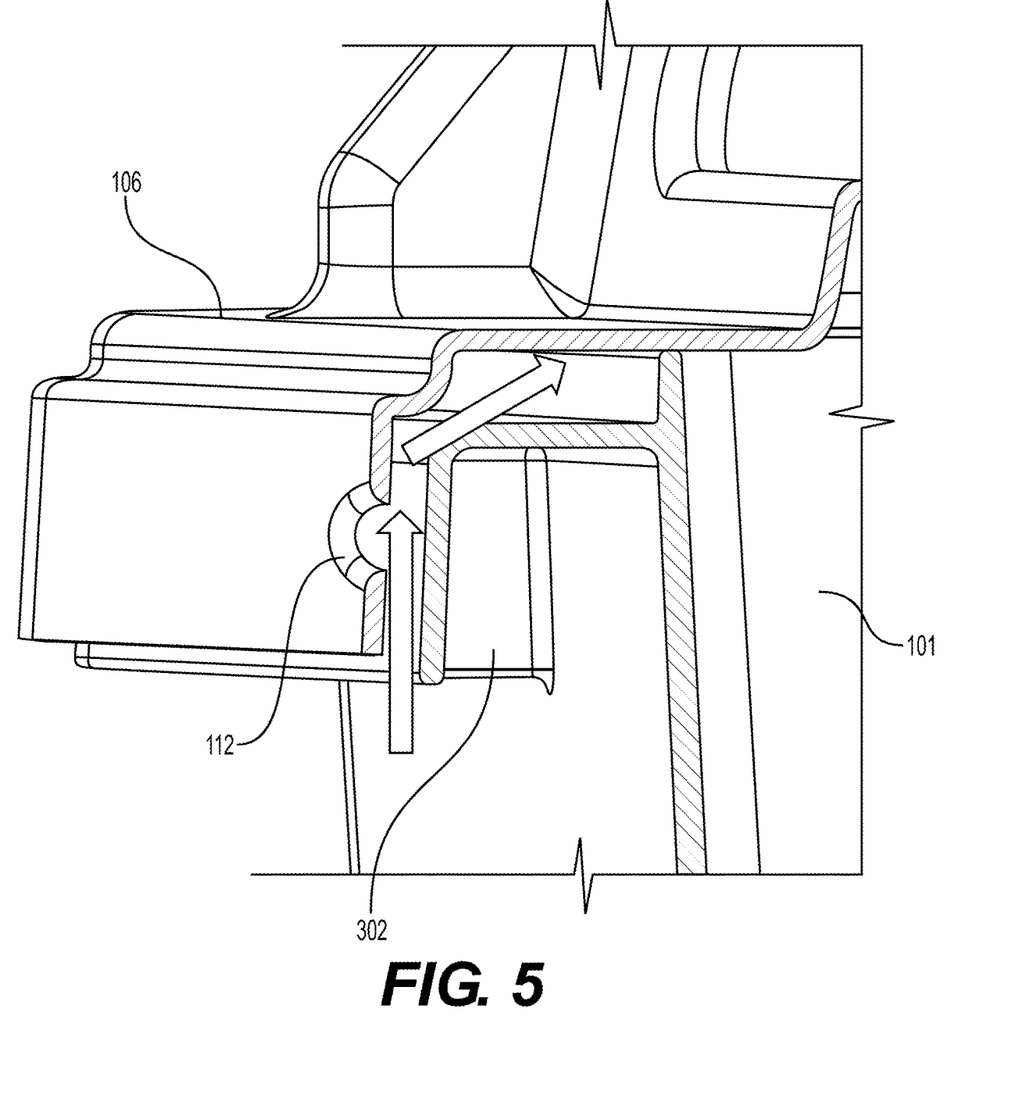
FIG. 5 depicts a cutaway cross-section of the key lock slot in relation to the container flange.

Key lock 112 is located on the front center face of skirt 106 as depicted in FIG. 1. A cutaway cross-section of the key lock 112 in relation to the container flange 302 is depicted in FIG. 5. In a preferred embodiment, key lock 112 is preferably round in shape that is ⅜" in diameter and ⅝" from the bottom flange. A user can place a lock through the key lock 112 and through a corresponding opening on container 101 to secure the document destruction lid 100.

Having the key lock 112 on the skirt 106 keeps the skirt 106 close to the container flange 302 of container 101. This makes it more challenging to feed a hand or a tool under skirt 106 to pry document destruction lid 100 up to fish out documents from container 101.

Figure 6:
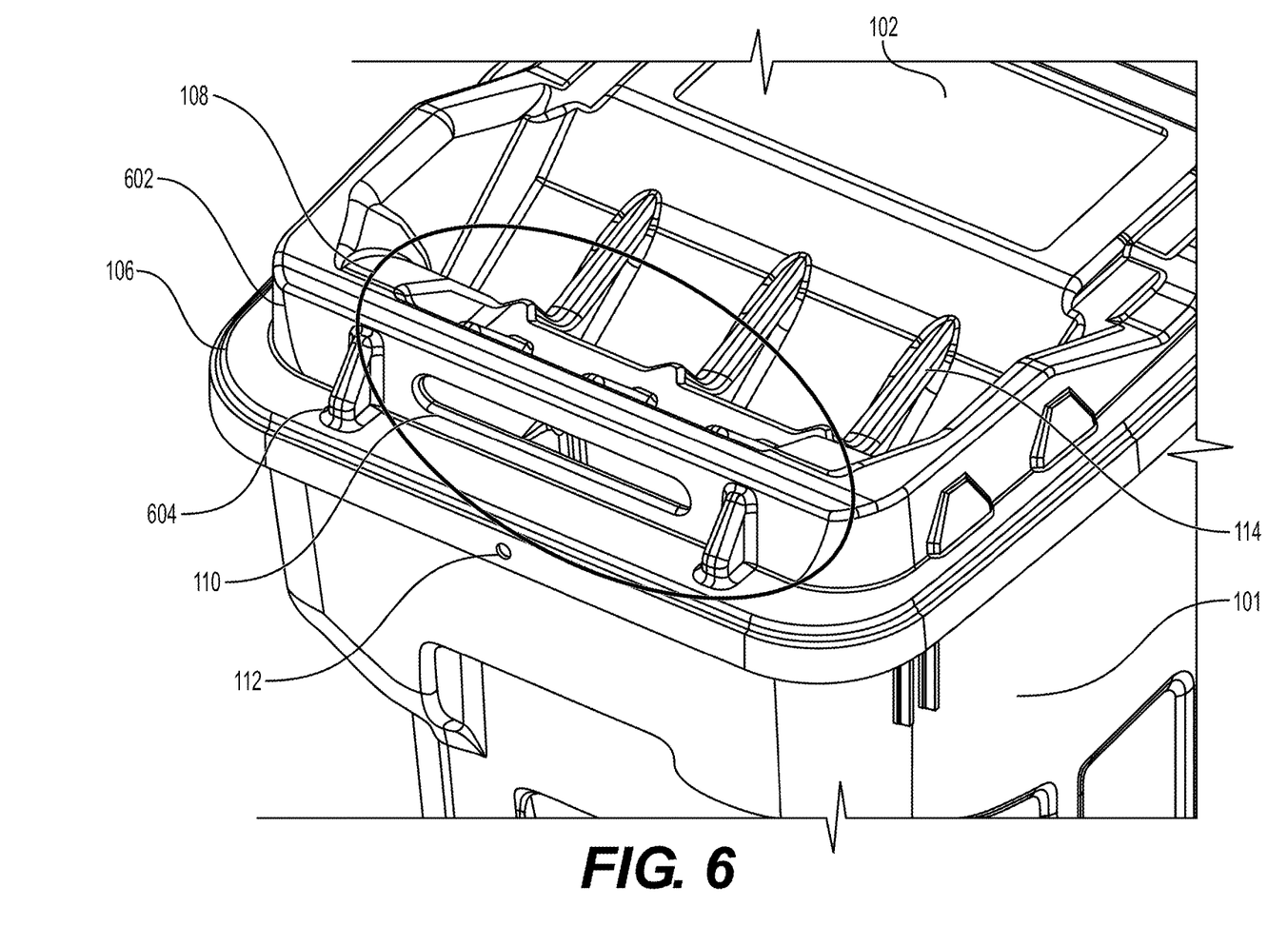
FIG. 6 depicts an enhanced view of FIG. 1 showing the security structure in more detail.
Figure 7:
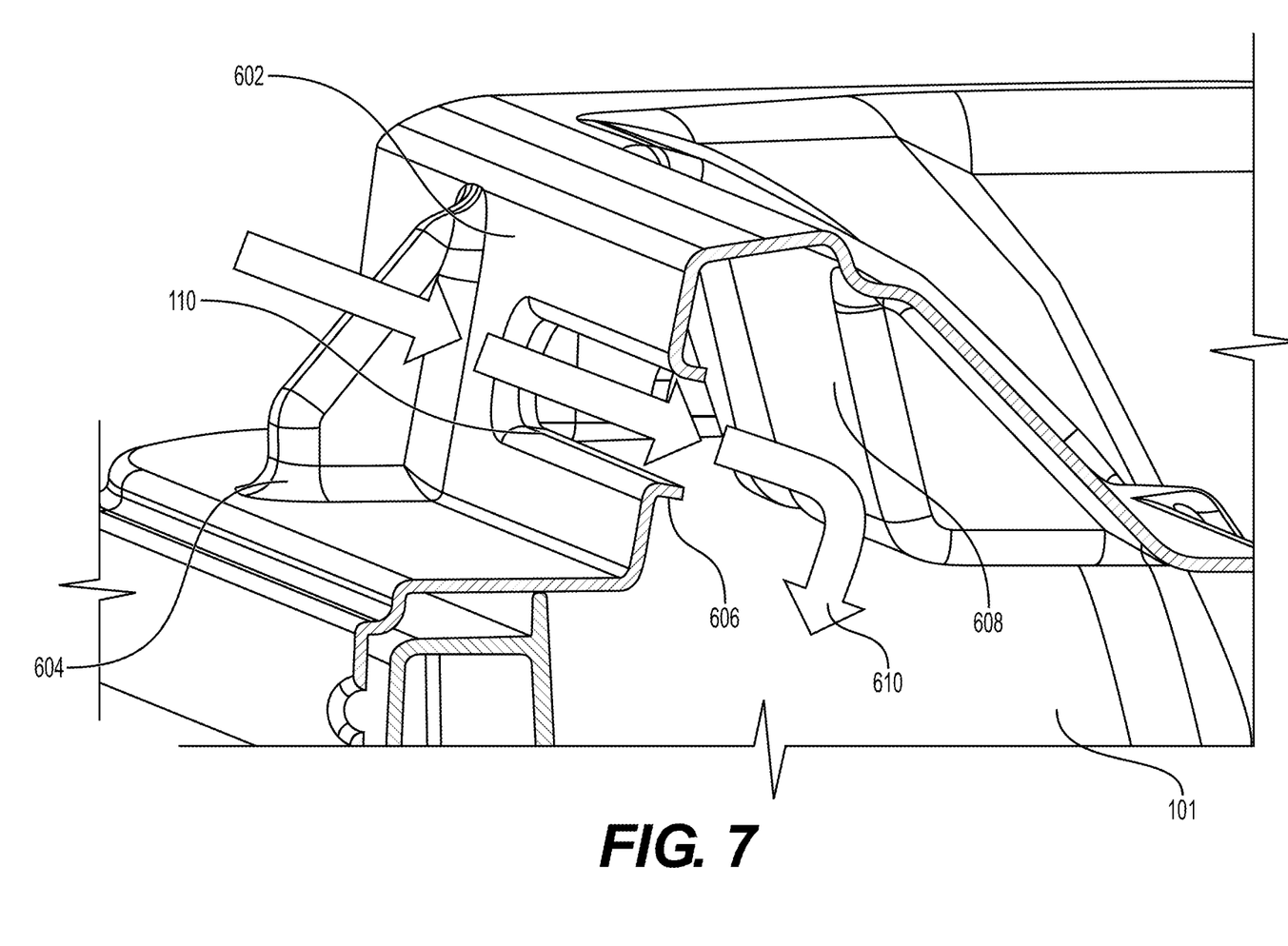
FIG. 7 depicts a cutaway view of FIG. 6 illustrating the document path through the security structure.

FIG. 6 depicts an enhanced view of FIG. 1 showing security structure 108 in more detail. FIG. 7 depicts a cutaway view of FIG. 6 illustrating the path a document takes into container 101. Document slot 110 is preferably ~11" in width to accommodate different paper sizes such as letter, legal, A4, etc. The height of document slot 110 is preferably ~1" in height, permitting multiple documents to be fed into document slot 110 simultaneously while preventing a user from putting their hand through document slot 110.

The front wall 602 of security structure 108 preferably comprises one or more reinforcing ribs 604 flanking document slot 110. As shown in FIG. 7, the interior edges 606 of document slot 110 are curved inward in the direction of the document path. Documents fed through document slot 108 contact rear wall 608, which is tapered towards front wall 602, and are urged downward into container 101, following the path of arrows 610 in FIG. 7. The taper of rear wall 608 directs the documents into container 101 and also prevents people from putting their hands through document slot 110 to fish out documents from container 101 as best shown in in FIG. 8.

Figure 8:
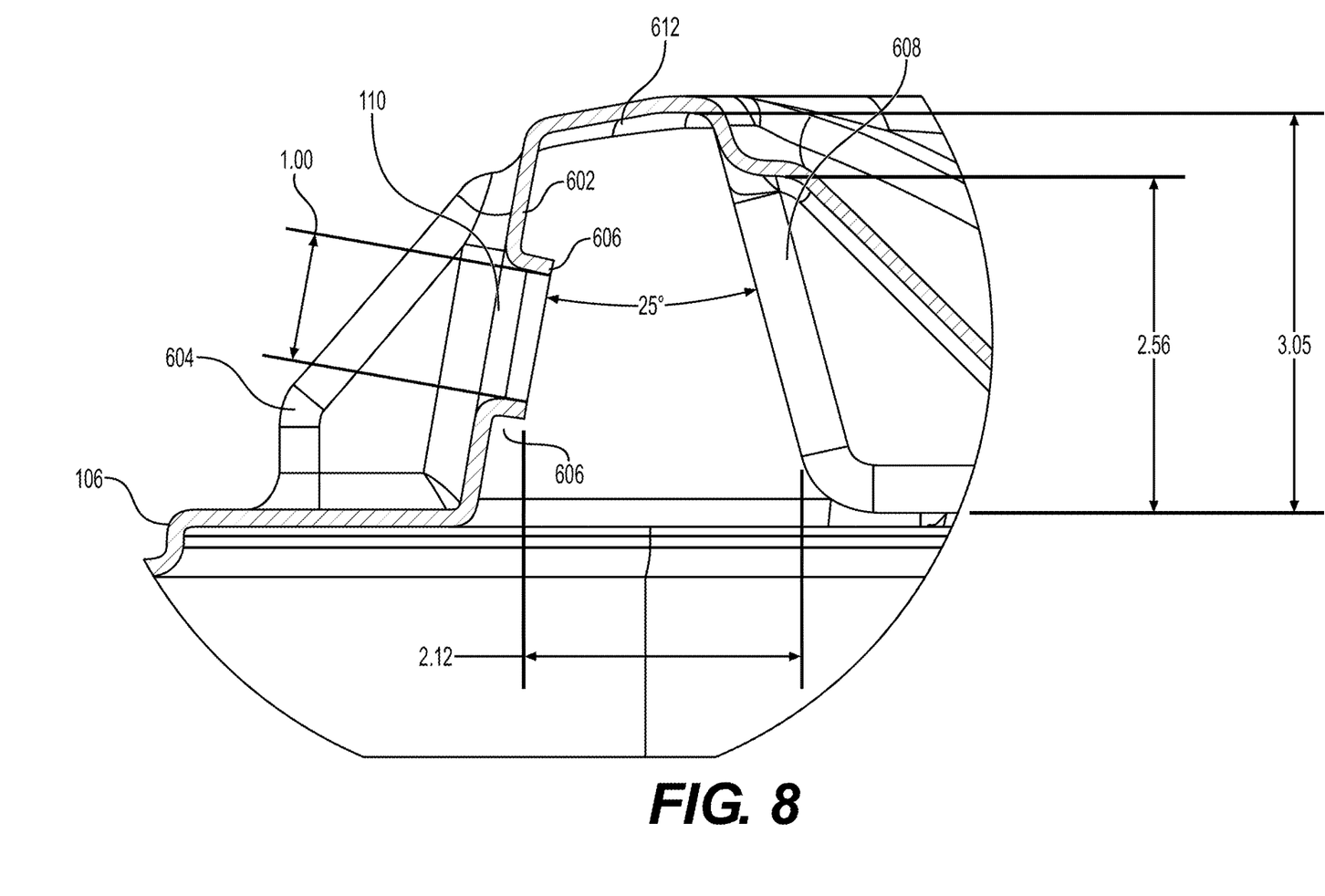
FIG. 8 depicts a cross-section view of the security structure.

Front wall 602 and rear wall 608 are angled towards each other at 20°-30°, but more preferably 25°, and are separated at top surface 612. The separation between the bottom of front wall 602 and rear wall 608 is preferably ~2.12". A vertical distance from skirt 106 to the top of front wall 602 or rear wall 608 is preferably 2.56"-3.05".

Front wall 602 is angled 2°-10°, but more preferably 5°, from vertical towards in the direction of rear wall 608. This angle increases the chances that document fed through document slot 110 start on a downward path.

The invention claimed is:

1. A lid comprising:
   a skirt extending around a periphery of the lid for securing the lid to a container,
      wherein the skirt comprises a vertical sidewall extending downward from a top surface of the lid;
   a security structure for depositing documents into the container, wherein the security structure comprises:
      a front wall extending upwards from a top surface of the lid,
      a horizontal slot arranged in a surface of the front wall,
      a rear wall extending upwards from the top surface of the lid opposite the front wall; and
      a top surface joining the front wall to the rear wall,
      wherein the horizontal slot comprises a rearward facing lip around a periphery of the horizontal slot,
   wherein a separation angle between the front wall and the rear wall is approximately 20°-30°.

2. The lid according to claim 1, wherein a separation angle between the front wall and the rear wall is 25°.

3. The lid according to claim 2, wherein the front wall is angled approximately 5° from vertical in a direction of the rear wall.

4. The lid according to claim 1, wherein the horizontal slot is approximately 11" across and 1" in height.

5. The lid according to claim 4, wherein a distance from a bottom of the horizontal slot to the rear wall is 2"-2.2".

6. The lid according to claim 5, wherein a distance from the top surface of the lid to a top surface of the security structure is 3"-3.1".

7. The lid according to claim 1, wherein the security structure further comprises:
   a pair of reinforcing ribs located adjacent the horizontal slot for reinforcing the front wall.

8. The lid according to claim 1, wherein the front wall and the rear wall are U-shaped.

9. The lid according to claim 1, further comprising:
   a plurality of transverse reinforcing ribs coupled to a top surface of the lid and the rear wall.

10. The lid according to claim 1, further comprising:
    a plurality of hinges for mating with a rail of the container.

11. The lid according to claim 10, wherein the vertical sidewall comprises at least one key slot arranged on a front-center of the skirt for securing the lid to the container with a lock.

12. The lid according to claim 1, wherein the lid is unitary in construction.

13. The lid according to claim 1, wherein the vertical sidewall has a height greater than or equal to 70% of a height of a lip of the container.

14. A lid comprising:
    a skirt extending around a periphery of the lid for securing the lid to a container,
       wherein the skirt comprises a vertical sidewall extending downward from a top surface of the lid;
    a security structure for depositing documents into the container, wherein the security structure comprises:
       a front wall extending upwards from a top surface of the lid,
       a horizontal slot arranged in a surface of the front wall,
       a rear wall extending upwards from the top surface of the lid opposite the front wall; and
       a top surface joining the front wall to the rear wall,
       wherein the lid is unitary in construction,
    wherein a separation angle between the front wall and the rear wall is approximately 20°-30°.

15. A lid comprising:
    a skirt extending around a periphery of the lid for securing the lid to a container,
       wherein the skirt comprises a vertical sidewall extending downward from a top surface of the lid;
    a security structure for depositing documents into the container, wherein the security structure comprises:
       a front wall extending upwards from a top surface of the lid,
       a horizontal slot arranged in a surface of the front wall,
       a rear wall extending upwards from the top surface of the lid opposite the front wall;
       a pair of reinforcing ribs located adjacent the horizontal slot for reinforcing the front wall; and
       a top surface joining the front wall to the rear wall,
    wherein a separation angle between the front wall and the rear wall is approximately 20°-30°.

* * * * *